United States Patent Office.

MICHAEL O'REILLY, OF NEW YORK, N. Y.

Letters Patent No. 110,275, dated December 20, 1870.

IMPROVEMENT IN THE PREPARATION OF COD-LIVER OIL.

The Schedule referred to in these Letters Patent and making part of the same.

*To all whom it may concern:*

Be it known that I, MICHAEL O'REILLY, of the city of New York, in the county and State of New York, have invented a new and improved Medical Compound; and I do hereby declare that the following is a full, clear, and exact description thereof, which will enable others skilled in the art to make and use the same.

My invention relates to cod-liver oil, and consists in a compound termed by me cod-liver oil butter, which is formed by the mechanical commixture therewith of butyraceous fat.

The invention consists, first, in the production of a cod-liver oil butter, that is to say, in combining the oil with a concrete or butyraceous fat; thereby the medical fat is brought into a form in which it can be conveniently prepared for the palate, either by using it as butter is now used on bread or other substance, or by making it up into pills or otherwise.

The invention consists further in the application to said butter of essential oils, by which the disagreeable odor of the cod-liver oil is neutralized without any injury to its medical qualities.

Finally, the invention consists in my improved method of treating the oil and other ingredients, in order to obtain the desired result.

The following is a description of the process:

To fifty pounds of cod-liver oil I add about an equal quantity of rendered fat which has been purified by melting at a temperature of 212° Fahrenheit. The oil is added when the fat has been cooled down to about 180°.

The mixture is then allowed to cool further down to about 65°, when the essential oil of almonds, caraway, cassia, or other aromatic innoxious substance is added, in quantities varying from eight to twenty ounces, according to the matter used.

The compound is stirred until sufficiently cool to fill into pots or jars.

Instead of beef fat, any other concrete or vegetable fat may be used.

The invention is equally applicable to the solidification and treatment of castor oil, and, in fact, of all other liquid oils used on account of their therapeutic qualities.

Having thus described my invention,

I claim as new and desire to secure by Letters Patent—

A compound formed of equal parts of cod-liver oil and rendered fat, mixed at a temperature of 180° Fahrenheit, as described.

MICHAEL O'REILLY.

Witnesses:
T. B. MOSHER,
GEO. W. MABEE.